US007480381B2

(12) United States Patent
Kahn et al.

(10) Patent No.: US 7,480,381 B2
(45) Date of Patent: *Jan. 20, 2009

(54) SUPER ENCRYPTED STORAGE AND RETRIEVAL OF MEDIA PROGRAMS IN A HARD-PAIRED RECEIVER AND STORAGE DEVICE

(75) Inventors: Raynold M. Kahn, Los Angeles, CA (US); Gregory J. Gagnon, Torrance, CA (US); David D. Ha, San Gabriel, CA (US); Peter M. Klauss, Torrance, CA (US); Christopher P. Curren, Brentwood, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/701,800

(22) Filed: Feb. 2, 2007

(65) Prior Publication Data

US 2007/0133795 A1    Jun. 14, 2007

Related U.S. Application Data

(63) Continuation of application No. 09/621,476, filed on Jul. 21, 2000, now Pat. No. 7,203,311.

(51) Int. Cl.
    *H04L 9/00* (2006.01)
(52) U.S. Cl. ......................................... 380/201; 705/51
(58) Field of Classification Search ................. 380/201, 380/210, 239–240; 713/189, 193; 725/25, 725/31; 705/51–52
See application file for complete search history.

(56) References Cited

U.S. PATENT DOCUMENTS 3,794,922 A    2/1974    Osborne et al.
(Continued)

FOREIGN PATENT DOCUMENTS

EA    0002703    8/2002
(Continued)

OTHER PUBLICATIONS

Non-final Office Action dated Jan. 18, 2008 in U.S. Appl. No. 10/759,679, filed Jan. 19, 2004 by Arsenault et al.
(Continued)

*Primary Examiner*—Minh Dieu Nguyen

(57) ABSTRACT

A method and apparatus for storing and retrieving program material for subsequent replay is disclosed. The apparatus comprises a tuner, for receiving a data stream comprising encrypted access control information and the program material encrypted according to a first encryption key, the access control information including the first encryption key; a first encryption module, communicatively coupled to the tuner and communicatively coupleable to a media storage device, for further encrypting the encrypted program material according to a second encryption key and for encrypting the second encryption key according to a third encryption key to produce a fourth encryption key; a first decryption module communicatively coupleable to the media storage device, for decrypting the fourth encryption key retrieved from the media storage device using the third encryption key to produce the second encryption key, and for decrypting the further encrypted program material retrieved from the media program device to produce the encrypted program material; a conditional access module communicatively coupled to the first decryption module, for decrypting the encrypted access control information to produce the first encryption key; and a second decryption module, for decrypting the program material using the first encryption key.

31 Claims, 6 Drawing Sheets

U.S. PATENT DOCUMENTS

| | | |
|---|---|---|
| 3,885,089 A | 5/1975 | Callais et al. |
| 4,241,237 A | 12/1980 | Paraskevakos et al. |
| 4,613,901 A | 9/1986 | Gilhousen et al. |
| 4,633,309 A | 12/1986 | Li et al. |
| 4,675,732 A | 6/1987 | Oleson |
| 4,694,490 A | 9/1987 | Harvey et al. |
| 4,866,769 A | 9/1989 | Karp |
| 4,866,787 A | 9/1989 | Olesen |
| 5,012,510 A | 4/1991 | Schaubs et al. |
| 5,015,830 A | 5/1991 | Masuzawa et al. |
| 5,033,084 A | 7/1991 | Beecher |
| 5,036,461 A | 7/1991 | Elliott et al. |
| 5,068,894 A | 11/1991 | Hoppe |
| 5,091,618 A | 2/1992 | Takahashi |
| 5,105,268 A | 4/1992 | Yamanouchi et al. |
| 5,115,467 A | 5/1992 | Esserman et al. |
| 5,132,992 A | 7/1992 | Yurt et al. |
| 5,168,353 A | 12/1992 | Walker et al. |
| 5,172,413 A | 12/1992 | Bradley et al. |
| 5,191,410 A | 3/1993 | McCalley et al. |
| 5,199,066 A | 3/1993 | Logan |
| 5,270,809 A | 12/1993 | Gammie et al. |
| 5,301,245 A | 4/1994 | Endoh |
| 5,301,352 A | 4/1994 | Nakagawa et al. |
| 5,331,139 A | 7/1994 | Lee |
| 5,335,277 A | 8/1994 | Harvey et al. |
| 5,357,276 A | 10/1994 | Banker et al. |
| 5,371,551 A | 12/1994 | Logan et al. |
| 5,381,481 A | 1/1995 | Gammie et al. |
| 5,386,587 A | 1/1995 | Yuzawa |
| 5,396,293 A | 3/1995 | Shellard |
| 5,421,031 A | 5/1995 | De Bey |
| 5,438,423 A | 8/1995 | Lynch et al. |
| 5,440,336 A | 8/1995 | Buhro et al. |
| 5,442,389 A | 8/1995 | Blahut et al. |
| 5,481,609 A | 1/1996 | Cohen et al. |
| 5,485,221 A | 1/1996 | Banker et al. |
| 5,495,531 A | 2/1996 | Smiedt |
| 5,504,816 A | 4/1996 | Hamilton et al. |
| 5,505,901 A | 4/1996 | Harney et al. |
| 5,506,902 A | 4/1996 | Kubota |
| 5,511,986 A | 4/1996 | Casey et al. |
| 5,557,541 A | 9/1996 | Schulhof |
| 5,559,549 A | 9/1996 | Hendricks et al. |
| 5,565,805 A | 10/1996 | Nakagawa et al. |
| 5,566,353 A | 10/1996 | Cho et al. |
| 5,583,937 A | 12/1996 | Ullrich et al. |
| 5,586,264 A | 12/1996 | Belknap et al. |
| 5,590,200 A | 12/1996 | Nachman et al. |
| 5,592,212 A | 1/1997 | Handelman |
| 5,592,491 A | 1/1997 | Dinkins |
| 5,592,651 A | 1/1997 | Rackman |
| 5,594,491 A | 1/1997 | Hodge et al. |
| 5,619,247 A | 4/1997 | Russo |
| 5,630,204 A | 5/1997 | Hylton et al. |
| 5,640,453 A | 6/1997 | Schuchman et al. |
| 5,642,418 A | 6/1997 | Ferris et al. |
| 5,661,517 A | 8/1997 | Budow et al. |
| 5,663,896 A | 9/1997 | Aucsmith |
| 5,664,046 A | 9/1997 | Abecassis |
| 5,666,645 A | 9/1997 | Thomas et al. |
| 5,675,390 A | 10/1997 | Schindler et al. |
| 5,677,895 A | 10/1997 | Mankovitz |
| RE35,651 E | 11/1997 | Bradley et al. |
| 5,684,742 A | 11/1997 | Bublitz et al. |
| 5,699,429 A | 12/1997 | Tamer et al. |
| 5,701,383 A | 12/1997 | Russo et al. |
| 5,701,582 A | 12/1997 | De Bey |
| 5,708,963 A | 1/1998 | Mobley et al. |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,000 A | 3/1998 | Sugimoto |
| 5,729,280 A | 3/1998 | Inoue et al. |
| 5,734,853 A | 3/1998 | Hendricks et al. |
| 5,748,732 A | 5/1998 | Le Berre et al. |
| 5,761,302 A | 6/1998 | Park |
| 5,764,762 A | 6/1998 | Kazmierczak et al. |
| 5,784,095 A | 7/1998 | Robbins et al. |
| 5,787,172 A | 7/1998 | Arnold |
| 5,790,663 A | 8/1998 | Lee et al. |
| 5,790,783 A | 8/1998 | Lee et al. |
| 5,793,413 A | 8/1998 | Hylton et al. |
| 5,793,971 A | 8/1998 | Fujita et al. |
| 5,805,699 A | 9/1998 | Akiyama et al. |
| 5,818,934 A | 10/1998 | Cuccia |
| 5,826,165 A | 10/1998 | Echeita et al. |
| 5,831,664 A | 11/1998 | Wharton et al. |
| 5,845,240 A | 12/1998 | Fielder |
| 5,848,158 A | 12/1998 | Saito et al. |
| 5,850,218 A | 12/1998 | LaJoie et al. |
| 5,864,747 A | 1/1999 | Clark et al. |
| 5,867,207 A | 2/1999 | Chaney et al. |
| 5,870,474 A | 2/1999 | Wasilewski et al. |
| 5,872,353 A | 2/1999 | Reichardt et al. |
| 5,889,941 A | 3/1999 | Tushie et al. |
| 5,892,535 A | 4/1999 | Allen et al. |
| 5,898,159 A | 4/1999 | Huang |
| 5,898,919 A | 4/1999 | Yuen |
| 5,899,582 A | 5/1999 | Dulac |
| 5,912,969 A | 6/1999 | Sasamoto et al. |
| 5,914,941 A | 6/1999 | Janky |
| 5,926,205 A | 7/1999 | Krause et al. |
| 5,930,215 A | 7/1999 | Fite et al. |
| 5,933,500 A | 8/1999 | Blatter et al. |
| 5,936,222 A | 8/1999 | Korsunsky et al. |
| 5,936,660 A | 8/1999 | Gurantz |
| 5,937,067 A | 8/1999 | Thatcher et al. |
| 5,953,418 A | 9/1999 | Bock et al. |
| 5,966,186 A | 10/1999 | Shigihara et al. |
| 5,973,756 A | 10/1999 | Erlin |
| 5,978,649 A | 11/1999 | Kahn et al. |
| 5,999,628 A | 12/1999 | Chan |
| 5,999,629 A | 12/1999 | Heer et al. |
| 6,005,937 A | 12/1999 | Lee |
| 6,006,987 A | 12/1999 | Hoolhorst |
| 6,011,511 A | 1/2000 | Chuong et al. |
| 6,025,868 A | 2/2000 | Russo |
| 6,038,319 A | 3/2000 | Chari |
| 6,041,056 A | 3/2000 | Bigham et al. |
| 6,055,314 A | 4/2000 | Spies |
| 6,055,566 A | 4/2000 | Kikinis |
| 6,061,451 A | 5/2000 | Muratani et al. |
| 6,061,452 A | 5/2000 | Suzuki |
| 6,064,724 A | 5/2000 | Kelly |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A | 7/2000 | Artigalas et al. |
| 6,097,441 A | 8/2000 | Allport |
| 6,105,134 A | 8/2000 | Pinder et al. |
| 6,105,868 A | 8/2000 | Reichardt |
| 6,141,531 A | 10/2000 | Williams et al. |
| 6,144,400 A | 11/2000 | Ebisawa |
| 6,148,081 A | 11/2000 | Szymanski et al. |
| 6,148,400 A | 11/2000 | Arnold |
| 6,154,206 A | 11/2000 | Ludtke |
| 6,157,719 A | 12/2000 | Wasilewski et al. |
| 6,157,949 A | 12/2000 | Cheng et al. |
| 6,163,284 A | 12/2000 | Munakata |
| 6,169,879 B1 | 1/2001 | Perlman |

| Patent No. | Date | Inventor |
|---|---|---|
| 6,178,242 B1 | 1/2001 | Tsuria |
| 6,202,211 B1 | 3/2001 | Williams, Jr. |
| 6,216,266 B1 | 4/2001 | Eastman et al. |
| 6,226,618 B1 | 5/2001 | Downs et al. |
| 6,229,895 B1 | 5/2001 | Son et al. |
| 6,240,401 B1 | 5/2001 | Oren et al. |
| 6,263,504 B1 | 7/2001 | Ebisawa |
| 6,266,481 B1 | 7/2001 | Lee et al. |
| 6,267,295 B1 | 7/2001 | Amagai et al. |
| 6,275,991 B1 | 8/2001 | Erlin |
| 6,286,142 B1 | 9/2001 | Ehreth |
| 6,288,716 B1 | 9/2001 | Humpleman et al. |
| 6,289,455 B1 | 9/2001 | Kocher et al. |
| 6,292,568 B1 | 9/2001 | Akins, III et al. |
| 6,298,441 B1 | 10/2001 | Handelman et al. |
| 6,317,883 B2 | 11/2001 | Marics |
| 6,317,884 B1 | 11/2001 | Eames et al. |
| D454,875 S | 3/2002 | McDowell et al. |
| 6,370,688 B1 | 4/2002 | Hejna |
| 6,381,747 B1 | 4/2002 | Wonfor et al. |
| 6,398,245 B1 | 6/2002 | Gruse et al. |
| 6,405,372 B1 | 6/2002 | Kim |
| 6,415,031 B1 | 7/2002 | Colligan et al. |
| 6,418,421 B1 | 7/2002 | Hurtado et al. |
| 6,418,424 B1 | 7/2002 | Hoffberg et al. |
| 6,424,947 B1 | 7/2002 | Tsuria et al. |
| 6,437,836 B1 | 8/2002 | Huang et al. |
| 6,442,525 B1 | 8/2002 | Silverbrook et al. |
| 6,456,985 B1 | 9/2002 | Ohtsuka |
| 6,466,671 B1 | 10/2002 | Maillard et al. |
| 6,466,921 B1 | 10/2002 | Corderu et al. |
| 6,473,858 B1 | 10/2002 | Shimomura et al. |
| 6,476,825 B1 | 11/2002 | Croy et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,510,519 B2 | 1/2003 | Wasilewski et al. |
| 6,516,412 B2 | 2/2003 | Wasilewski et al. |
| 6,516,465 B1 | 2/2003 | Paskins |
| 6,519,693 B1 | 2/2003 | De Bey |
| 6,519,772 B1 | 2/2003 | Bopardikar |
| 6,530,085 B1 | 3/2003 | Perlman |
| 6,539,548 B1 | 3/2003 | Hendricks et al. |
| 6,542,870 B1 | 4/2003 | Matsumoto |
| 6,550,011 B1 | 4/2003 | Sims, III |
| 6,560,340 B1 | 5/2003 | Akins, III et al. |
| 6,574,609 B1 | 6/2003 | Downs et al. |
| 6,588,017 B1 | 7/2003 | Calderone |
| 6,588,673 B1 | 7/2003 | Chan et al. |
| 6,591,419 B2 | 7/2003 | Barry et al. |
| 6,611,812 B2 | 8/2003 | Hurtado et al. |
| 6,622,307 B1 | 9/2003 | Ho |
| 6,637,027 B1 | 10/2003 | Breslauer et al. |
| 6,654,547 B1 | 11/2003 | Maeda et al. |
| 6,655,580 B1 | 12/2003 | Ergo et al. |
| 6,668,377 B1 | 12/2003 | Dunn |
| 6,681,326 B2 | 1/2004 | Son et al. |
| 6,687,683 B1 | 2/2004 | Harada et al. |
| 6,697,489 B1 | 2/2004 | Candelore |
| 6,701,528 B1 | 3/2004 | Arsenault et al. |
| 6,714,650 B1 | 3/2004 | Maillard et al. |
| 6,741,834 B1 | 5/2004 | Godwin |
| 6,745,245 B1 | 6/2004 | Carpenter |
| 6,748,080 B2 | 6/2004 | Russ et al. |
| 6,754,827 B1 | 6/2004 | Cane et al. |
| 6,754,904 B1 | 6/2004 | Cooper et al. |
| 6,766,451 B1 | 7/2004 | Van Rijnsoever |
| 6,772,133 B1 | 8/2004 | Kambayashi et al. |
| 6,772,434 B1 | 8/2004 | Godwin |
| 6,804,357 B1 | 10/2004 | Ikonen et al. |
| 6,810,387 B1 | 10/2004 | Yim |
| 6,816,970 B2 | 11/2004 | Morgan et al. |
| 6,834,111 B1 | 12/2004 | Nishimura et al. |
| 6,853,728 B1 | 2/2005 | Kahn et al. |
| 6,862,582 B2 | 3/2005 | Harada et al. |
| 6,889,208 B1 | 5/2005 | Okabe et al. |
| 6,904,522 B1 | 6/2005 | Benardeau et al. |
| 6,912,513 B1 | 6/2005 | Candelore |
| 6,934,963 B1 | 8/2005 | Reynolds et al. |
| 6,961,858 B2 | 11/2005 | Fransdonk |
| 6,987,854 B2 | 1/2006 | Maillard |
| 6,993,499 B2 | 1/2006 | Gagnon et al. |
| 7,035,827 B2 | 4/2006 | Ezaki |
| 7,093,295 B1 | 8/2006 | Saito |
| 7,177,911 B2 | 2/2007 | deCarmo |
| 7,191,335 B1 | 3/2007 | Maillard |
| 2001/0001876 A1 | 5/2001 | Morgan et al. |
| 2001/0053979 A1 | 12/2001 | Kori |
| 2001/0056576 A1 | 12/2001 | Park |
| 2002/0001386 A1 | 1/2002 | Akiyama |
| 2002/0013948 A1 | 1/2002 | Aguayo, Jr. et al. |
| 2002/0021805 A1 | 2/2002 | Schumann et al. |
| 2002/0023219 A1 | 2/2002 | Treffers et al. |
| 2002/0056112 A1 | 5/2002 | Dureau et al. |
| 2002/0100052 A1 | 7/2002 | Daniels |
| 2002/0101991 A1 | 8/2002 | Bacon et al. |
| 2002/0112235 A1 | 8/2002 | Ballou et al. |
| 2002/0112243 A1 | 8/2002 | Hunter et al. |
| 2002/0116705 A1 | 8/2002 | Perlman et al. |
| 2002/0162104 A1 | 10/2002 | Raike et al. |
| 2002/0166121 A1 | 11/2002 | Rovira |
| 2002/0170054 A1 | 11/2002 | Kudelski et al. |
| 2002/0170072 A1 | 11/2002 | Lundbald et al. |
| 2003/0005285 A1 | 1/2003 | Graunke |
| 2003/0005429 A1 | 1/2003 | Colsey |
| 2003/0018968 A1 | 1/2003 | Avnet |
| 2003/0026428 A1 | 2/2003 | Loisel |
| 2003/0037006 A1 | 2/2003 | Maruyama et al. |
| 2003/0040962 A1 | 2/2003 | Lewis et al. |
| 2003/0061477 A1 | 3/2003 | Kahn et al. |
| 2003/0088876 A1 | 5/2003 | Mao et al. |
| 2003/0097622 A1 | 5/2003 | Liu et al. |
| 2003/0110132 A1 | 6/2003 | Sako |
| 2003/0122966 A1 | 7/2003 | Markman et al. |
| 2003/0131349 A1 | 7/2003 | Kuczynski-Brown |
| 2003/0145183 A1 | 7/2003 | Muehring et al. |
| 2003/0156649 A1 | 8/2003 | Abrams, Jr. |
| 2003/0174844 A1 | 9/2003 | Candelore |
| 2003/0177365 A1 | 9/2003 | Buhan et al. |
| 2003/0196113 A1 | 10/2003 | Brown et al. |
| 2003/0196204 A1 | 10/2003 | Thiagarajan et al. |
| 2003/0208771 A1 | 11/2003 | Mensgen et al. |
| 2003/0228911 A1 | 12/2003 | Dernis et al. |
| 2003/0229898 A1 | 12/2003 | Babu et al. |
| 2003/0229900 A1 | 12/2003 | Reisman |
| 2004/0032950 A1 | 2/2004 | Graunke |
| 2004/0068747 A1 | 4/2004 | Robertson et al. |
| 2004/0073954 A1 | 4/2004 | Bjordammen et al. |
| 2004/0088558 A1 | 5/2004 | Candelore |
| 2004/0126093 A1 | 7/2004 | Platt et al. |
| 2004/0148634 A1 | 7/2004 | Arsenault et al. |
| 2004/0168071 A1 | 8/2004 | Silverbrook |
| 2004/0190721 A1 | 9/2004 | Barrett et al. |
| 2004/0205812 A1 | 10/2004 | Candelore |
| 2004/0260798 A1 | 12/2004 | Addington et al. |
| 2004/0261126 A1 | 12/2004 | Addington et al. |
| 2005/0005286 A1 | 1/2005 | Koskela et al. |
| 2005/0039025 A1 | 2/2005 | Main et al. |
| 2005/0050333 A1 | 3/2005 | Yeap et al. |
| 2005/0061884 A1 | 3/2005 | Stewart |
| 2005/0071280 A1 | 3/2005 | Irwin et al. |
| 2005/0084102 A1 | 4/2005 | Hollar |
| 2005/0086696 A1 | 4/2005 | Daniels |
| 2005/0091681 A1 | 4/2005 | Borden et al. |

| | | | |
|---|---|---|---|
| 2005/0107157 | A1 | 5/2005 | Wachtfogel et al. |
| 2005/0108519 | A1 | 5/2005 | Barton et al. |
| 2005/0144248 | A1 | 6/2005 | Doganowski et al. |
| 2005/0144468 | A1 | 6/2005 | Northcutt et al. |
| 2005/0169468 | A1 | 8/2005 | Fahrny et al. |
| 2005/0182931 | A1 | 8/2005 | Robert et al. |
| 2005/0183112 | A1 | 8/2005 | Duval |
| 2005/0195975 | A1 | 9/2005 | Kawakita |
| 2005/0204391 | A1 | 9/2005 | Hunleth et al. |
| 2005/0216942 | A1 | 9/2005 | Barton |
| 2005/0235361 | A1 | 10/2005 | Alkove et al. |
| 2005/0249350 | A1 | 11/2005 | Kahn et al. |
| 2006/0085835 | A1 | 4/2006 | Istvan et al. |
| 2006/0168663 | A1 | 7/2006 | Viljoen et al. |
| 2006/0179489 | A1 | 8/2006 | Mas Ribes |

FOREIGN PATENT DOCUMENTS

| | | |
|---|---|---|
| EP | 0677949 | 10/1995 |
| EP | 0710017 | 5/1996 |
| EP | 0936812 | 8/1999 |
| EP | 0975165 | 1/2000 |
| EP | 0989557 | 3/2000 |
| EP | 1122910 | 8/2001 |
| EP | 1304871 | 4/2003 |
| EP | 1418701 | 5/2004 |
| GB | 2272822 | 5/1994 |
| JP | 04-175025 | 6/1992 |
| JP | 05-284499 | 10/1993 |
| JP | 06-351023 | 12/1994 |
| JP | 08-125651 | 5/1996 |
| JP | 10-013784 | 1/1998 |
| JP | 11-136708 | 5/1999 |
| JP | 11220444 | 8/1999 |
| JP | 11284584 | 10/1999 |
| JP | 2000-122539 | 4/2000 |
| WO | WO 91/11884 | 8/1991 |
| WO | WO 98/56180 | 12/1998 |
| WO | WO 99/18729 | 4/1999 |
| WO | WO 99/43120 | 8/1999 |
| WO | 0008909 A2 | 2/2000 |
| WO | WO 00/13412 | 3/2000 |
| WO | WO 00/14967 | 3/2000 |
| WO | WO 00/19294 | 4/2000 |
| WO | WO 00/30354 | 5/2000 |
| WO | WO 01/22724 | 3/2001 |
| WO | WO 01/37546 | 5/2001 |
| WO | WO 01/82600 | 11/2001 |
| WO | WO 02/063879 | 8/2002 |
| WO | WO 03/101105 | 12/2003 |
| WO | WO 2004/017637 | 2/2004 |
| WO | WO 2004/057871 | 7/2004 |
| WO | WO 2004/082286 | 9/2004 |

OTHER PUBLICATIONS

Notice of Allowance dated Dec. 5, 2007 in U.S. Appl. No. 09/620,833, filed Jul. 21, 2000 by Kahn et al.
Notice of Allowance dated Dec. 10, 2007 in U.S. Appl. No. 09/960,824, filed Sep. 21, 2001 by Kahn et al.
Non-final Office Action dated Dec. 4, 2007 in U.S. Appl. No. 10/758,811, filed Jan. 16, 2004 by Kahn et al.
Final Office Action dated Jan. 23, 2008 in U.S. Appl. No. 09/620,772, filed Jul. 21, 2000 by Kahn et al.
Tsubakiyama, Hideki and Koga, Keiichiro; "Security for Information Data Broadcasting System with Conditional-Access Control"; IEEE; 1993; pp. 164-170.
EBU Project Group B/CA; "Functional Model of a Conditional Access System"; EBU Technical Review; Jun. 10, 1995; pp. 64-77.
U.S. Appl. No. 10/758,865, filed Jan. 16, 2004, Raynold M. Kahn, Non-final Office action dated Sep. 25, 2007.
U.S. Appl. No. 10/758,818, filed Jan. 16, 2004, Raynold M. Kahn, Final Rejection dated Aug. 20, 2007.
U.S. Appl. No. 10/790,466, filed Mar. 1, 2004, Stephen P. Dulac, Final Rejection dated Oct. 10, 2007.
Ma, Huangon; Shin, Kang G.; "Multicast Video on Demand Services"; ACM SIGCOMM Computer Communication Review; vol. 32, Issue 1; Jan. 2002; pp. 31-43; ACM Press; New York, NY.
Tantoui, et al.; "Interaction with Broadcast Video"; International Multimedia Conference Proceedings of the 10th ACM International Conference on Multimedia; pp. 29-38; ACM Press; New York, NY; ISBN: 1-58113-620-X.
Carsten et al.; "Protecting VoD The Easier Way"; International Multimedia Conference Proceedings of the 6th ACM International Conference on Multimedia; pp. 21-28; ACM Press; New York, NY; ISBN: 0-201-30990-4.
U.S. Appl. No. 09/620,772, filed Jul. 21, 2000, Kahn et al.
U.S. Appl. No. 09/620,773, filed Jul. 21, 2000, Kahn et al.
U.S. Appl. No. 09/620,833, filed Jul. 21, 2000, Kahn et al.
U.S. Appl. No. 09/621,476, filed Jul. 21, 2000, Kahn et al.
U.S. Appl. No. 11/205,249, filed Aug. 16, 2005, James et al.
U.S. Appl. No. 60/707,387, filed Aug. 11, 2005, Kahn et al.
"PocketTV Brings Video to Palm-size PC", Mar. 9, 2000[online][retrieved on Apr. 16, 2003] Retrieved from the Internet Archive (WayBack Machine) using Internet <URL: http://web.archieve.org/web/20000816034339/www.palmsizepc.com/mar2000-14-1.html>.
"HP Jornada 430/430se Palm-size PC: User's Guide", Hewlett Packard, 1999, pp. 7-9.
"HP Jornada 430/430se Palm-size PC: User's Guide-Chapter 6", Hewlett Packard, 1999, pp. 43-54.
P. Venkat Rangan, et al., *Designing An On-Demand Multimedia Service*, IEEE Communications Magazine, Jul. 1992, vol. 30, No. 7, title page and pp. 56-64.
Wanjiun Liao, et al., *The Split And Merge Protocol For Interactive Video-On-Demand*, IEEE MultiMedia, Oct.-Dec. 1997, vol. 4, No. 4, index and pp. 51-62.
Robert Johnston, et al., *A Digital Television Sequence Store*, IEEE Transactions on Communications, May 1978, vol. Com-26, No. 5, index and pp. 594-600.
*Proposed SMPTE Standard for Television—Splice Points for MPEG-2 Transport Streams*, SMPTE Journal, Oct. 1998, SMPTE 312M, pp. 916-925.
Michael Robin, et al., *Digital Television Fundamentals—Design And Installation Of Video And Audio Systems*, McGraw-Hill, Chapter 8, title page(s) and pp. 345-425.
Yongchen Li, et al., *Security Enhanced MPEG Player*, IEEE, 1996, pp. 169-175.
Fink, Dan, "*Ready To Take The Dive? It's fast-forward as new DVD and Divx formats hit market (includes graphic: Home video: the next generation plus: Some selections that show off the system)*", York Daily Record, Dec. 21, 1998, pp. 1-3.
Sin-Joo Lee, et al., *A Survey Of Watermarking Techniques Applied To Multimedia*, IEEE, 2001, pp. 272-277.
1st Report of EBU/SMPTE Task Force for Harmonized Standards for the Exchange of Television Program Material as Bit Streams, May 6, 1997, Version 1.30, pp. 1-73.
Bruce Schneier, Applied Cryptography—Protocols, Algorithms, and Source Code in C, 2nd Edition, pp. 216-222, 357-362.
"PocketTV-MPEG movie player for Pocket PC and WinCE" [online], May 17, 2000 MPEG TV, LLC [retrieved on Mar. 26, 2004]. Retrieved from the Internet <URL: http://web.archive.org/web/200006210123803/www.mpegtv.com/wince/pockettv/index.html>.
"Download PocketTV (beta) for WinCE" [online], Nov. 3, 1999 MPEG TV, LLC [retrieved on Mar. 26, 2004]. Retrieved from the Internet <URL: http://web-archive.org/web/19991127093158/www.mpegtv.com/wince/pockettv/index.html>.
Anerousis, N., "*Skycast: The Satellite Digital Broadcast Relay Service*", ATT&T Labs Research, unpublished manuscript, 1999, pp. 1-4.
"*Introduction to Encryption Theory*", published by Kyoritsu Shuppan Co., Feb. 25, 1993.
"PKCS #1 v2.1: RSA Cryptography Standard"; Jun. 14, 2002; RSA Laboratories; 61 pages.
Japanese Office Action dated Jun. 17, 2008 in Japanese counterpart Application No. 2001-222222 corresponding to U.S. Appl. No.

09/621,476, filed Jul. 21, 2000 by Raynold M. Kahn et al., now issued Apr. 10, 2007 as US Patent No. 7,203,311.

Japanese Office Action dated Jun. 10, 2008 in Japanese counterpart Application No. 2005-04430 corresponding to U.S. Appl. No. 09/620,833, filed Jul. 21, 2000 by Raynold M. Kahn et al.

Notice of Allowance dated Apr. 21, 2008 in U.S. Appl. No. 09/620,772, filed Jul. 21, 2000 by Raynold M. Kahn et al.

Summons to attend Oral Proceedings dated Sep. 24, 2008 in European patent Application No. 01117554.4 filed Jul. 20, 2001 by Raynold M. Kahn et al.

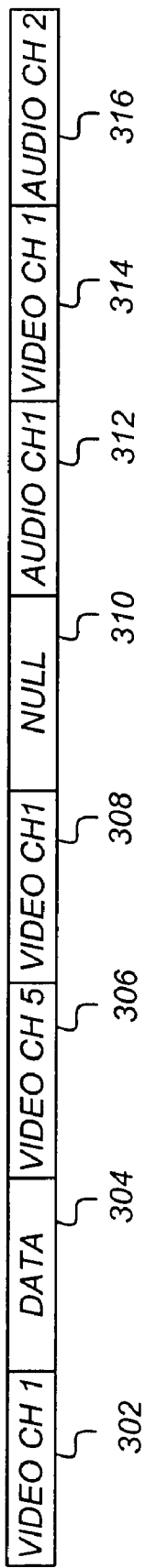
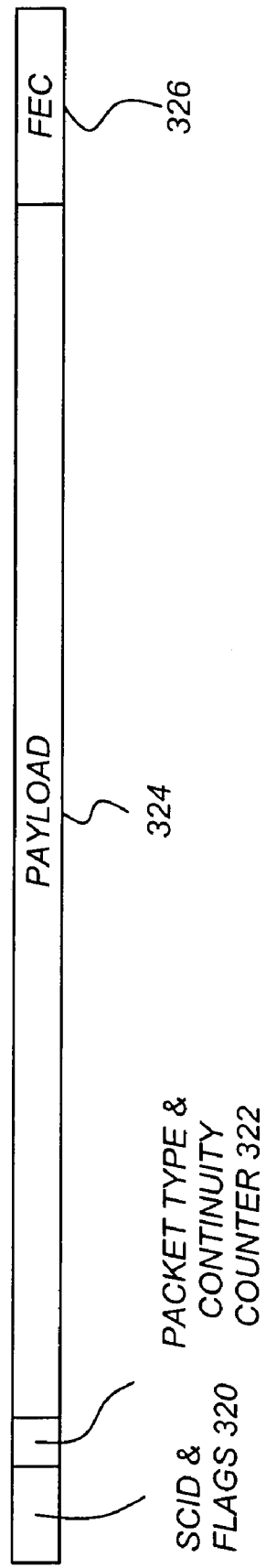

SUPER ENCRYPTED STORAGE AND RETRIEVAL OF MEDIA PROGRAMS IN A HARD-PAIRED RECEIVER AND STORAGE DEVICE

CROSS-REFERENCE TO RELATED APPLICATIONS

This application is a continuation of U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed Jul. 21, 2000, now issued as U.S. Pat. No. 7,203,311, which application is hereby incorporated by reference herein. This application also is related to the following patent applications, all of which applications are hereby incorporated by reference herein:

U.S. patent application Ser. No. 09/620,833, entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed Jul. 21, 2000;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed Jul. 21, 2000, now issued as U.S. Pat. No. 7,203,314;

U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed Jul. 21, 2000;

U.S. patent application Ser. No. 09/620,832, entitled "VIDEO ON DEMAND PAY PER VIEW SERVICES WITH UNMODIFIED CONDITIONAL ACCESS FUNCTIONALITY" by Raynold M. Kahn, Gregory J. Gagnon, David D. Ha, Peter M. Klauss, Christopher P. Curren, and Thomas H. James, filed Jul. 21, 2000, now issued as U.S. Pat. No. 6,853,728; and U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed Jan. 26, 2000, now issued as U.S. Pat. No. 6,701,528.

BACKGROUND OF THE INVENTION

1. Field of the Invention

The present invention relates to systems and methods for providing video program material to subscribers, and in particular to a method and system for securely storing and replaying media programs.

2. Description of the Related Art

In recent years, there has been increasing interest in allowing cable and satellite television subscribers to record broadcast media programs for later viewing. This capability, hereinafter referred to as personal video recording (PVR), can be used to provide video-on-demand (VOD) services, or simply to allow the subscriber to save media programs for repeated viewing and/or archival purposes.

In the past, video cassette tape recorders (VCRs) have been used for such personal video recording. Recently, however, hard disks, similar to those used in personal computers, have been used to store media programs for later viewing. Unlike VCRs, such devices typically do not include a tuner, and are instead coupled to the satellite receiver or cable box. Also unlike VCRs, these devices are typically used to record digital content, not analog video. This difference is both advantageous and disadvantageous.

An advantage of such devices is that they permit long term storage and multiple replays without substantial degradation. Another advantage is that they permit more rapid trick-play functions such as fast forwarding and rewinding. A disadvantage of such devices is that they are capable of making multiple-generation copies of the program material as well, and without serious degradation. This raises the very real possibility that the multiple generation copies of the media programs will be produced and distributed without permission. This possibility has caused some media providers to be reluctant to allow their media programs to be recorded by such devices.

To ameliorate this problem, it is critical to protect the stored media programs with strong security and copy control. Current devices do not scramble media programs before storage, nor do they store copy protection information. Instead, such devices record decrypted program content into the storage disk using a paired hardware scheme in which the hard disk controller and hard disk are paired to each other specifically through a specific interface. Because the hard disk controller and the disk itself are essentially paired together, storage or playback will not function if the disk were to be removed and transferred to another player. The weakness of this security scheme is that it relies only on the paired hardware to ensure security . . . the media programs stored on the disk drive itself are not encrypted.

While it would presumably be possible to simply store the datastream as it is received from the broadcaster for later replay, this technique has distinct disadvantages. One such disadvantage is that it would provide pirates a permanently recorded version of the encrypted datastream, thus providing the pirate with information that can be used to perform detailed analyses of the datastream itself to determine the encryption techniques and codes.

What is needed is a system and method for securely recording broadcast media programs (including impulse purchase pay-per-view programs) for limited use playback at a later time. Such a system could be used to support video-on-demand (VOD), thus allowing the subscriber to purchase media programs and games from the set top box instantly without worrying about the start time of the program. What is also needed is a system and method that does not require substantial changes to subscriber hardware, such as the integrated receiver/decoder (IRD), or the conditional access module (CAM) that is used to provide a key to decrypt the media programs for presentation to the subscribers.

SUMMARY OF THE INVENTION

In summary, the present invention describes a system and method for storing and retrieving program material for subsequent replay. The method comprises the steps of receiving a data stream comprising the program material encrypted according to a first encryption key and control data, the control data comprising the first encryption key and being encrypted; further encrypting the encrypted program material according to a second encryption key; encrypting the second encryption key according to a third encryption key to produce a fourth encryption key; storing the further encrypted program material and control data and the fourth encryption key.

The apparatus comprises a tuner, for receiving a data stream comprising encrypted access control information and the program material encrypted according to a first encryption key, the access control information including the first encryption key; a first encryption module, communicatively coupled to the tuner and communicatively coupleable to a media storage device, for further encrypting the encrypted program material according to a second encryption key and for encrypting the second encryption key according to a third encryption key to produce a fourth encryption key; a first decryption module communicatively coupleable to the media storage device, for decrypting the fourth encryption key retrieved from the media storage device using the third encryption key to produce the second encryption key, and for decrypting the further encrypted program material retrieved from the media program device to produce the encrypted program material; a conditional access module communicatively coupled to the first decryption module, for decrypting the encrypted access control information to produce the first encryption key; and a second decryption module, for decrypting the program material using the first encryption key.

One object of the present invention is to provide a system allowing for growth to pay-per-play or true video-on-demand (VOD) services from media programs stored on a hard disk. The pay-per-play service allows the subscriber to select media programs or games from the real time broadcast data or from the media programs stored on the disk. VOD service permits the subscriber to purchase provided media programs and games from the subscriber's receiver instantly, without regard to the start time of the program.

Another object of the present invention is to provide for the reception and decryption of broadcast media programs, including impulse pay-per-view (IPPV) programs, that can be played and recorded onto storage media and allows playback at a later time with limited use. The data itself may be placed in short term storage, but the replay of the media programs can be accomplished with trick play functions such as forward, reverse, fast forward, fast reverse, frame advance, and pause functions.

Another object of the present invention is to provide PVR functions which provide recording, delayed playback, and trick play of IPPV media programs from the storage media without requiring a pre-purchase of the IPPV media program. This would allow the IPPV media program to be viewed without requiring the IPPV media program to be purchased prior to storage. Ideally, such a system would allow the user to select the IPPV media program from the storage device, subject to limited play rights.

Still another object of the present invention is to provide a pairing between the storage media and elements of the subscriber's IRD to assure that playback of the media programs from the storage device are permitted only with the proper IRD.

Still another object of the present invention is to provide a secure means for storing broadcast data streams (including IPPV and games) on a data storage device, while providing for adequate copy protection.

Still another object of the present invention is to provide a system and method for handling the archiving and retrieving of media programs and other data, even if the data storage device fails.

Still another object of the present invention is to provide a system and method that allows media program purchases to be recorded in a way that is analogous to that which is employed for real-time off-the-air programs.

Still another object of the present invention is to provide a system that provides a growth path to a system permitting IPPV media programs to be previewed without charge for an initial period of time with the option to purchase the media program or cancel the purchase, regardless of whether the program is retrieved from the storage device or obtained from a real time broadcast.

The present invention eliminates concerns regarding the proliferation of unauthorized digital copies of the media programs by use of a strong encryption method. Further, the present invention ensures that the stored material cannot be distributed since such decryption of the material can only be successfully performed by the encrypting IRD. At the same time, the present invention can be implemented with minimal changes to the IRD, and no changes to the CAM interface. The present invention also provides a basis for a growth path to more advanced encryption/decryption techniques.

BRIEF DESCRIPTION OF THE DRAWINGS

Referring now to the drawings in which like reference numbers represent corresponding parts throughout:

FIG. 3A is a diagram of a representative data stream received from a satellite;

FIG. 3B is a diagram illustrating the structure of a data packet;

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
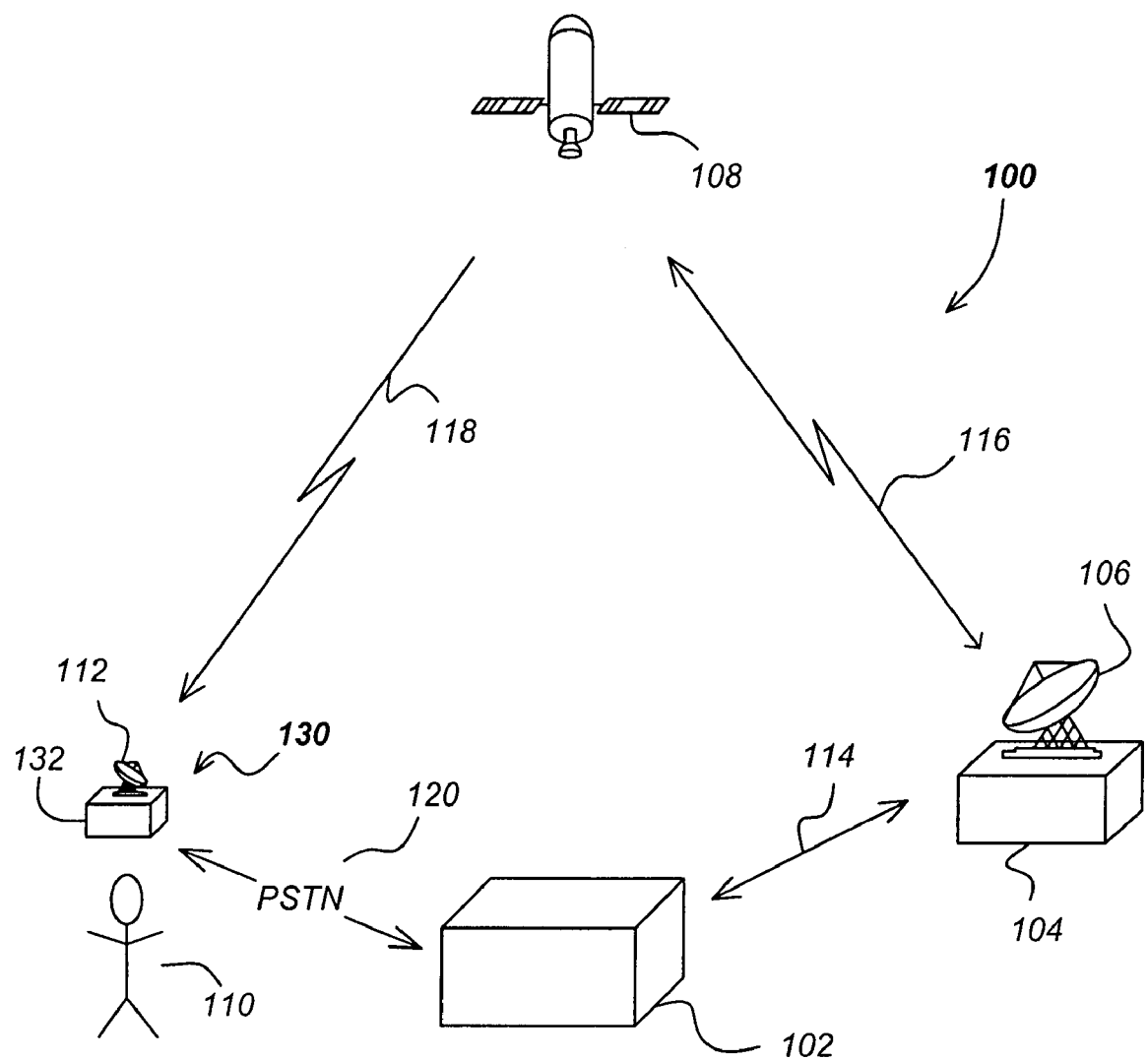
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground or other link 114 and an integrated receiver/decoder (IRD) 132 at receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the IRD 132 at the receiver station 130 via downlink 118. The IRD 132 receives this information using the subscriber antenna 112 to which it is communicatively coupled.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

Figure 2:
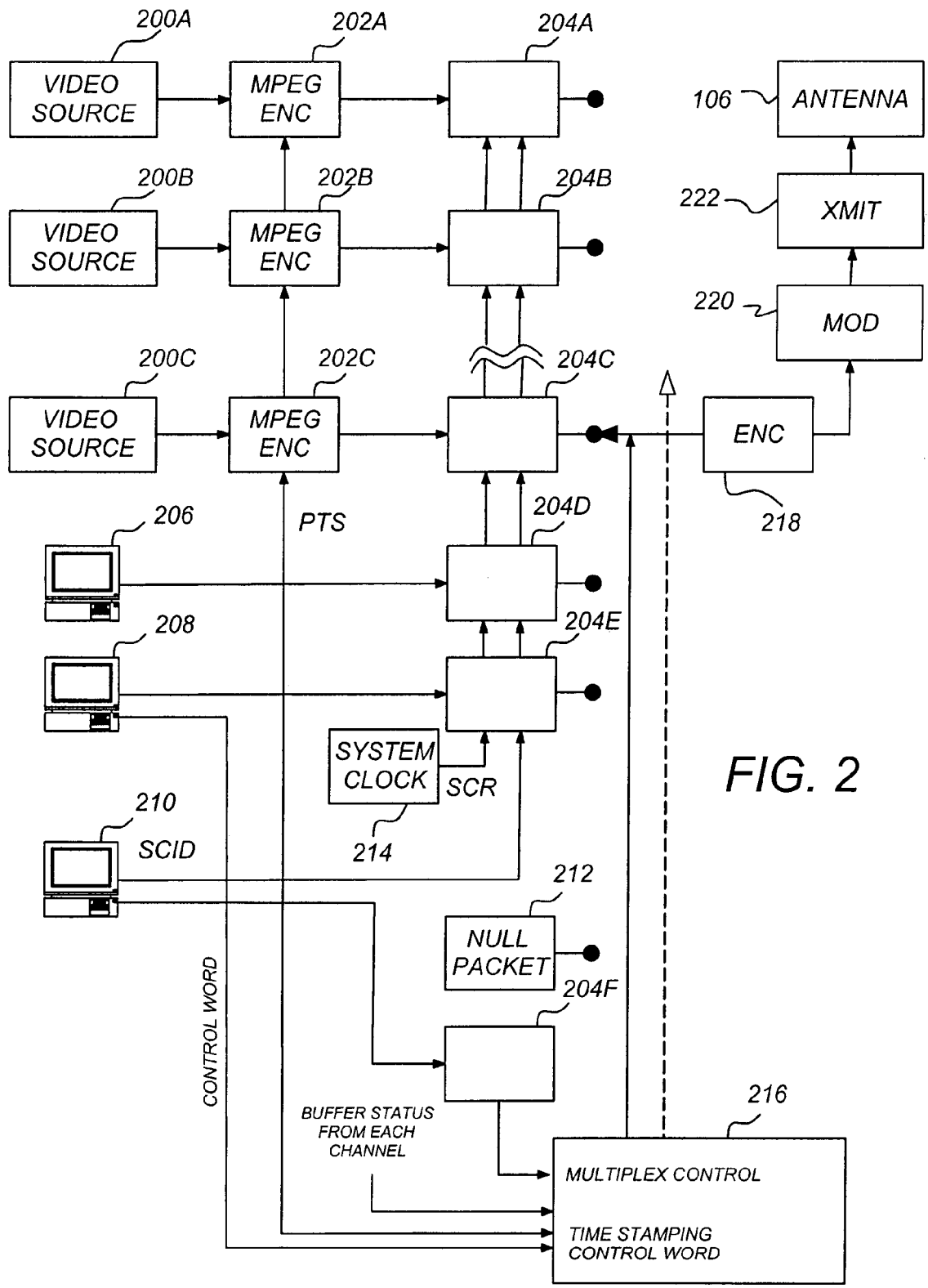
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200, 206-210.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an alphanumeric encryption key referred to hereinafter as a control word (CW). This can be accomplished by a variety of data encryption techniques, including the data encryption standard (DES) and the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Requesting Pay-Per-View Services

The data required to receive pay-per-view (PPV) media programs are stored in the CWP and in another data packet known as the purchase information parcel (PIP). Both the CWP and the PIP are broadcast to the subscriber via the video distribution system 100 in real time. As described below, the CWP is used by the IRD 132 to retrieve PPV media programs.

Generally, PPV services can include operator-assisted pay-per-view (OPPV) and impulse pay-per-view (IPPV) services. When requesting OPPV services, the subscriber 110 must decide in advance that they desire access to a particular media program. The subscriber 110 then calls an entity such as the control center 102, and requests access to the media program. When requesting impulse pay-per-view services (IPPV), the subscriber 110, while viewing the program guide, moves the cursor over the viewer channel associated with the desired media program, and selects "enter." After the decision and rights to purchase a PPV program are confirmed (for example, by checking channel lockouts, rating limits, and purchase limits), a purchase information parcel (PIP) is received and stored in the subscriber's conditional access module 406 (which is described in more detail below) for further use. The conditional access module 406 associates the information in the CWP and the PIP, and uses the PIP in conjunction with the CWP to verify that the subscriber 110 should be provided access to the media program and to decrypt the media program.

Ordering PPV media programs in advance using the PIP is limited, however, since the PIP is broadcast up to 24 hours before the media program itself is broadcast. Since the PIP is broadcast in real time, the IRD 132 does not acquire the PIP until the subscriber 110 actually requests the PPV media program purchase.

Subscriber Reception and Decryption of Media Programs

Figure 4:
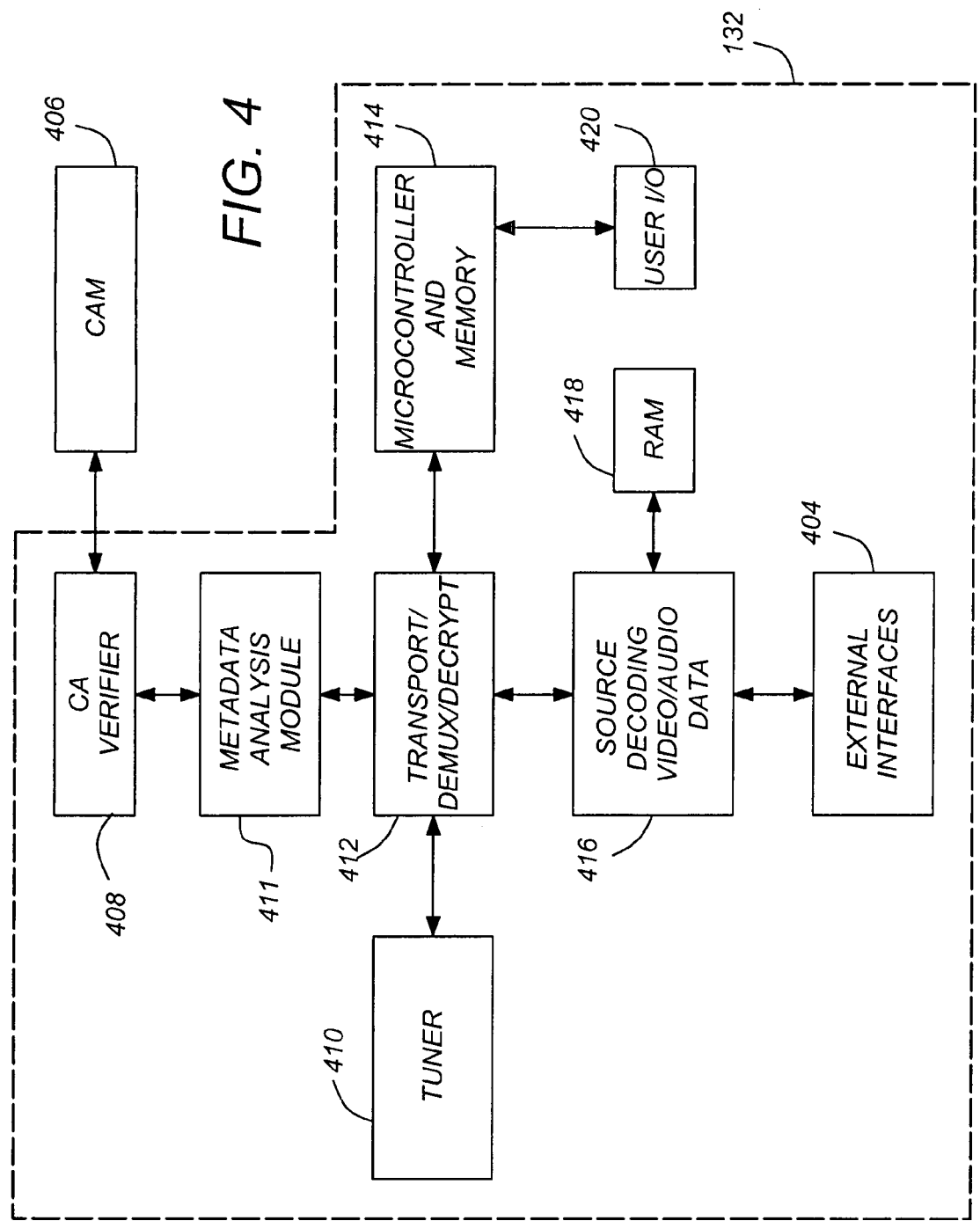
FIG. 4 is a block diagram illustrating a high-level block diagram of the IRD.

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs. The CAV 408 is communicatively coupled to a metadata analysis module (MAM) 411. Using the information in metadata table (e.g. Table 1 described below), the MAM 411 acts as a gate-keeper to determine whether stored media programs will be decrypted and presented to the subscriber 110. This is accomplished by comparing the metadata values with measured or accumulated values. The CAV 408 and the MAM 411 can be implemented as separate modules from the transport/demux/decryptor 412 and the microcontroller and memory 414 as shown, or may be implemented via software instructions stored in the memory and performed by the microcontroller 414.

The IRD 132 comprises a tuner 410, a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

The tuner receives the data packets from the video distribution system and provides the packets to the TDM 412. Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959.

Storage and Retrieval of Media Programs in Encrypted Form

Figure 5:
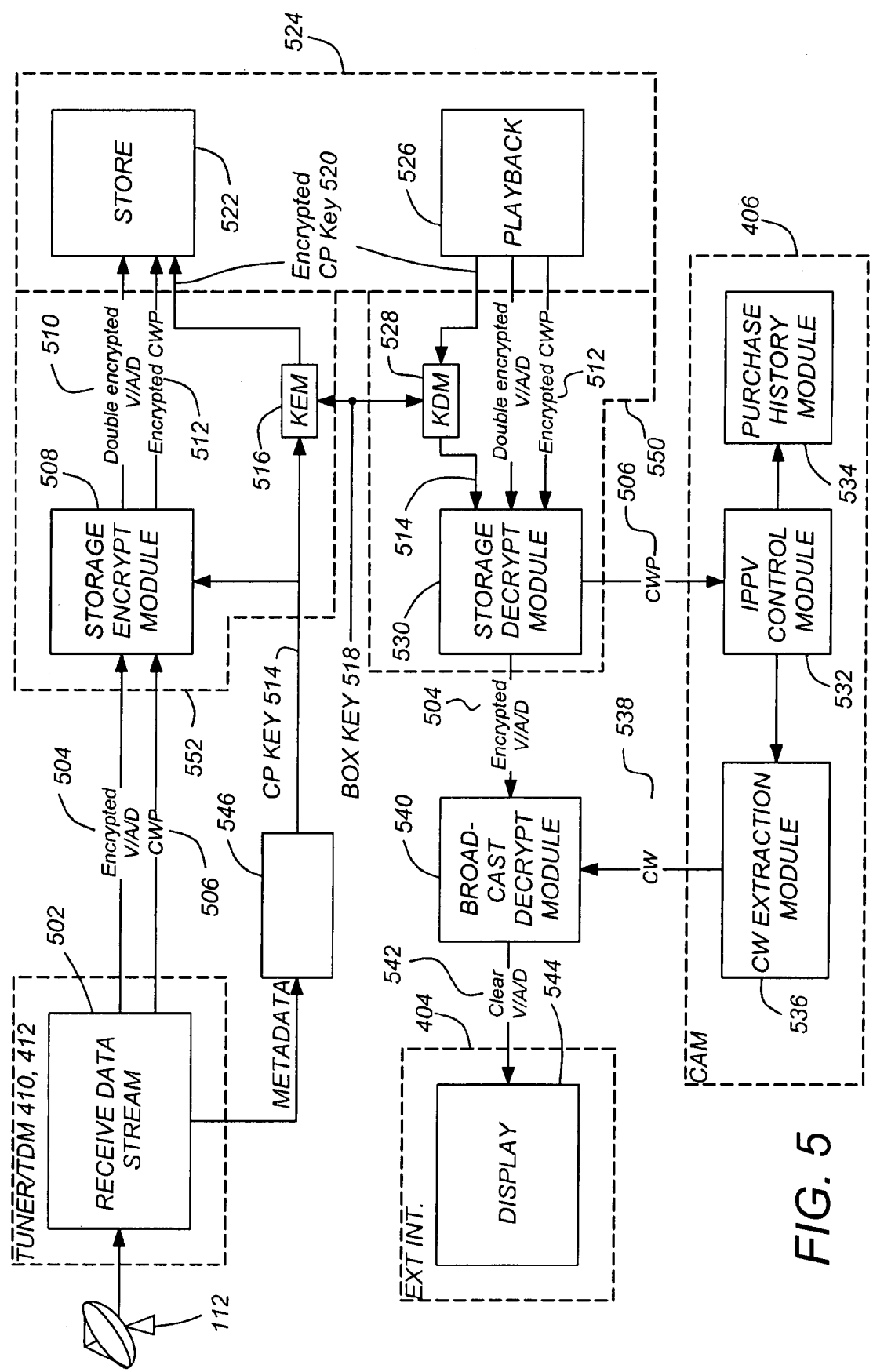
FIG. 5 is a diagram illustrating the storage and retrieval of data from a media storage device.

FIG. 5 is a diagram presenting exemplary method steps used to practice one embodiment of the present invention. A data stream is provided by subscriber antenna 112 and received by the tuner 410 and the TDM 412, as shown in block 502. The data stream includes a plurality of data packets including data packets with the program material 504 encrypted according to a first encryption key (CW key 538) and access control information which is manifested within one or more control word packets (CWP 506). The control word packets 506 include an encrypted version of the CW key 538. The data stream may also include metadata having replay rights. The replay rights are parameters necessary for controlling the replay of IPPV or pay-per-play services.

The encrypted program material 504 (denoted Encrypted V/A/D in FIG. 5 to indicate that the program material can include video, audio, or other data) is then provided to a first encryption module 552. The first encryption module 552 includes a storage encryption module 508 and a key encryption module (KEM) 516. The CP encryption module 508 encrypts the encrypted program material 504 (thus further encrypting the encrypted program material 504) and the CWP 506 with a copy protection (CP) key 514. In one embodiment, this is accomplished via a triple 56 bit Data Encryption Standard (DES) cipher block chaining (CBC). RSA encryption may also be used, but triple DES is temporally more efficient, and is therefore preferred.

In one embodiment, the CP key 514 is derived using a CP generation module 546 from the properties of the replay rights and other metadata in the broadcast stream. Depending on the metadata, the CP key 514 may also be time variant with the broadcast program material. In another embodiment, the CP key may be augmented with at least a portion of the metadata before being encrypted with the box key 518 in the KEM 516 and stored in the media storage device as the encrypted CP key 520. In this embodiment, when the encrypted CP key 520 is decrypted, the CP key and related metadata are both produced. The metadata can then be used to verify and/or control replay of the program material. The CP key 514 may also be internally generated by the IRD 132 without the metadata.

The key encryption module 516 also encrypts the CP key 514 with the box key 518 to produce an encrypted CP key 520. In one embodiment, the box key 518 is stored within the IRD 132. For example, the box key 518 could be an internal electronic serial number (ESN) of an integrated circuit implementing some or all of the functions of the TDM 412 (hereinafter, the "transport chip"). Incorporating the ESN into the encryption key ensures that only that IRD 132 that stored the encrypted information in the media storage device can successfully decrypt the stream.

The further encrypted program material 510, the encrypted CWP 512, and the encrypted CP key 520 is then stored 522 in the media storage device 524. The media storage device 524 is typically a hard drive, but may be any device with sufficient capacity and access time to support recording and/or playback operations of the data stored therein.

When the subscriber 110 decides to play back the stored media programs, an appropriate user input is provided on the user I/O device 420. The user input may comprise a play command, a fast forward command, a reverse command, a fast play or fast reverse play command, or a pause command. In response to the user input, the stored data is retrieved from the media storage device 524. This data includes the further encrypted program material 510, the encrypted CWP 512, and the encrypted CP key 520. The encrypted CP key 520 is decrypted using the box key 518 to produce the CP key 514. This CP key 514 is used to decrypt the further encrypted media program material 510 and the encrypted CWP 512 to produce the encrypted media program 504 and the CWP 506, respectively. The CWP 506 is provided to the CAM 406.

The IPPV control module 532 determines whether the requested media program is a PPV program (IPPV or OPPV). If so, the subscriber 110 is informed that the media program selected is a PPV program. If the subscriber 110 elects to receive the PPV program, a PPV request is accepted, and the purchase history module 534 collects and records the information regarding the requested program material so that the subscriber 110 can be billed for viewing the media program. In one embodiment, the PPV request is compared to the replay right information in the metadata to determine if the program material that is the subject of the PPV request should be decrypted and provided. For example, the replay right metadata could be used to indicate that the program could be viewed for a specific period of time, or for a particular number of showings.

The CWP 506 is then provided to the CW extraction module 536, which produces the CW key 538. In one embodiment, this is accomplished in the CAM 406 via application of the I/O indecipherable algorithm discussed above. Using the CW key 538, the encrypted program material 504 is decrypted to produce a clear version of the media program 542.

Using the foregoing scheme, the encrypted program material and the CWP 506 must be tracked and correlated during decryption by the IRD 132. This may be accomplished by correlation through time stamps, and/or MPEG I and P frames. Since each playback of program requires the CP decryption (via CP key 538) and the CA decryption (via CW) process, the decryption may be slowed enough to cause video lagging or blank out during trick play functions. This problem could be minimized by setting aside sufficient buffer memory to handle the decoded video.

After suitable processing (i.e. MPEG and or JPEG decoding, decompression, conversion to an analog signal, etc.), the media program is provided to an external interface 404 device, which may include a presentation device such as a display 544.

In one embodiment of the present invention, the data stream received in IRD 132 further comprises metadata including data to control replay rights and copy protection. This metadata can be encrypted by the CP encrypt module 552 and stored in the media storage device 524 for later decryption and use when a request to view the media program is received. Alternatively, the metadata can be encrypted and broadcast in the data stream in real time for all PPV-enabled media programs, thus obviating the need for storing the information in the media storage device 524.

As described above, the relationship between the CWP 506 and the encrypted media program may be time-varying. However, in the nominal case described above, since both the CWP 506 and the encrypted program material 504 associated with the same time stamps are stored, replay of the stored material can be performed without modification to either the time stamps or the CWP 506. However, if temporally-limited replay rights are desired, the time stamps or associated with the CWP 506 or the CWP 506 itself may be modified prior to storage.

Although the foregoing has been described with respect to a plurality of encryption modules (e.g. modules 508 and 516) and decryption modules (e.g. modules 528 and 530), the present invention can be implemented with single encryption module, a single decryption module, or a single encryption/decryption module. In one embodiment of the present invention, the operations performed by modules 508, 516, 528, and 530, are performed in a single integrated circuit device such as the transport chip.

Figure 6:
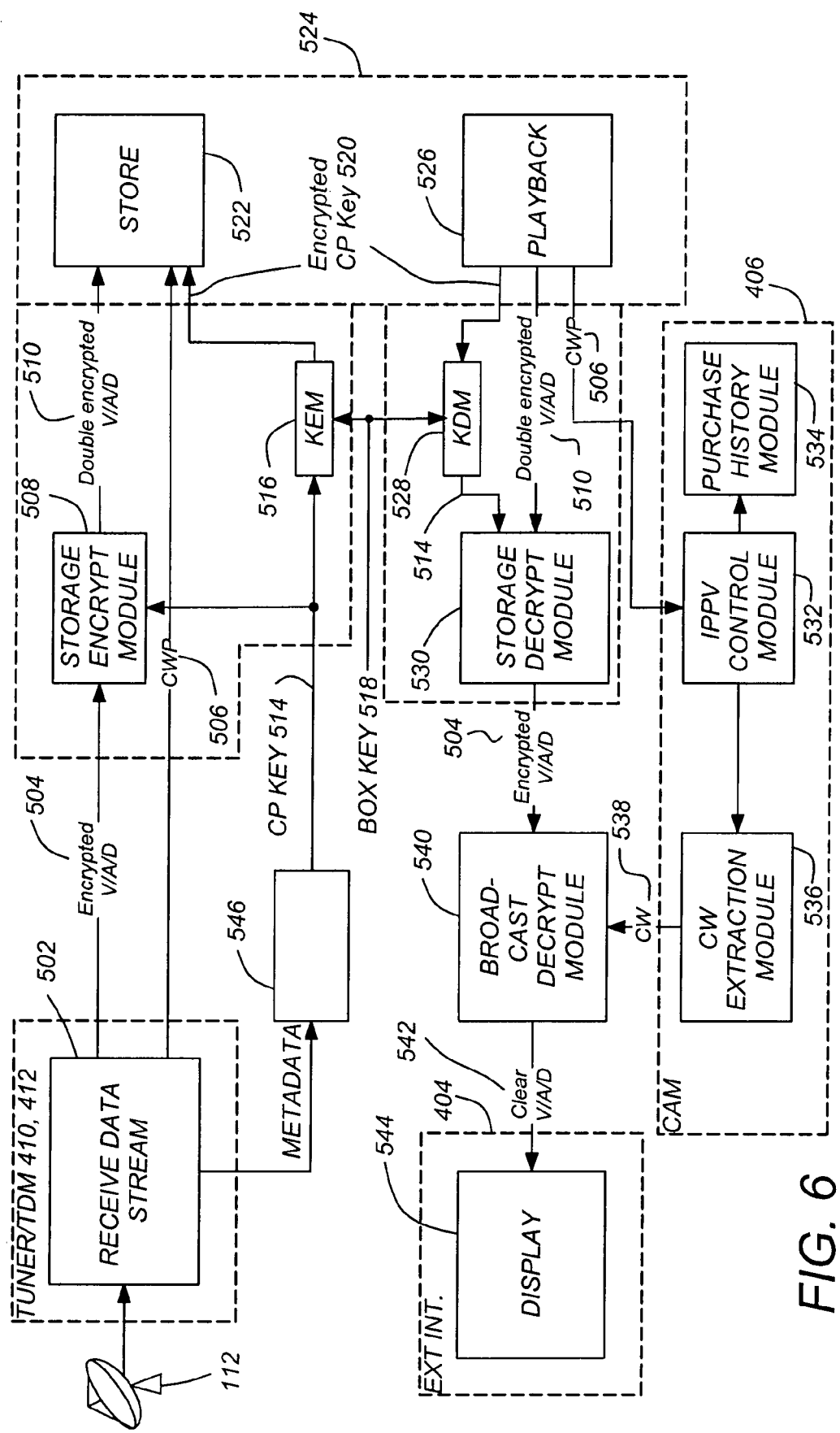
FIG. 6 is a diagram illustrating the storage and retrieval of data from the media storage device in an alternative embodiment of the invention.

FIG. 6 is diagram presenting an alternative embodiment of the present invention in which the CWP 506 is stored in the media storage device without encryption by the CP key 514. In this embodiment, the CWP 506 is read from the media storage device 524 and provided to the CAM 406, and need not be decrypted using the CP key 514. One advantage of this embodiment is that it requires fewer encryption and decryption operations, thus allowing the program materials to be more quickly stored and retrieved from the media storage device and presented to the user. This embodiment is particularly advantageous for embodiments using trick play features.

CONCLUSION

The present invention describes encryption and decryption functions that enhance the security of the data stored on the disk drive by further encrypting (with a CP or copy protection key) the already encrypted program material comprising a video/audio/data MPEG stream before storage. These encryption and decryption functions are provided by IRD 132, preferably within the transport chip. Since the broadcast data stream is not decrypted before storage on the media storage device, but rather further encrypted, a clear version is not exposed to possible compromise before storage on the media storage device. Further, since the encrypted broadcast stream is further encrypted before storage, the encrypted broadcast stream is not available for potential pirates to analyze to try to break the broadcast stream encryption scheme.

In one embodiment, metadata is included in the data stream broadcast to the IRD 132. This metadata includes replay rights and other parameters necessary for controlling the replay of the media program. This replay rights included in this metadata and/or the broadcast time of the program material can be used to derive the CP key 514 that is used to further encrypt (already) encrypted program material.

The program material requested for storage into the media storage device includes the further encrypted version of the encrypted program material and the CWP 506. This further encrypted data is not decrypted until the user starts the playback of the program from the media storage device.

Once playback is initiated, the further encrypted data and the encrypted CWP 506 is decrypted using the CP key 514. The decrypted CWP 506 is provided to the CAM 406. The CAM 406 decrypts the CWP 506, and provides the resulting CW 538 to a broadcast decryption module to decrypt the encrypted program material.

The present invention protects the data stored in the media storage device from pirates and does not expose the program material in an unencrypted form until the viewer has requested (and paid for) the program material. Further, this is accomplished without introducing additional CAM 406 functions. By using the metadata to derive a CP key 514 to scramble the encrypted program data and CAM 406, the present invention provides additional security, while providing a growth path permit more advanced pay per view features The foregoing description of the preferred embodiment of the invention has been presented for the purposes of illustration and description. It is not intended to be exhaustive or to limit the invention to the precise form disclosed. Many modifications and variations are possible in light of the above teaching. For example, the encryption functions described herein could be performed by separate encryption/decryption modules, or a single multi-purpose encryption/decryption module can be utilized to perform the encryption/decryption functions of many separate modules.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of storing program material for subsequent replay, comprising steps of:
   receiving a data stream comprising the program material encrypted according to a first encryption key and an encrypted first encryption key;
   further encrypting the encrypted program material according to a second encryption key;
   encrypting the second encryption key according to a third encryption key to produce a fourth encryption key; and
   providing the further encrypted program material, the encrypted first encryption key and the fourth encryption key for storage.

2. The method of claim 1, further comprising steps of:
   retrieving the further encrypted program material from storage, encrypted first encryption key, and the fourth encryption key;
   decrypting the fourth encryption key using the third encryption key to produce the second encryption key;
   decrypting the further encrypted program material with the second encryption key to produce the encrypted program material;
   decrypting the encrypted first encryption key to produce the first encryption key; and
   decrypting the encrypted program material using the first encryption key.

3. The method of claim 1, further comprising steps of:
further encrypting the encrypted first encryption key according to the second encryption key; and
providing the further encrypted first encryption key for storage.

4. The method of claim 3, further comprising steps of:
retrieving the stored further encrypted program material, further encrypted first encryption key, and the fourth encryption key from storage;
decrypting the fourth encryption key using the third encryption key to produce the second encryption key;
decrypting the further encrypted program material with the second encryption key to produce the encrypted program material;
decrypting the further encrypted first decryption key according to the second encryption key to produce the first decryption key;
decrypting the further encrypted first encryption key to produce the first encryption key; and
decrypting the encrypted program material using the first encryption key.

5. The method of claim 4, further comprising steps of:
accepting a pay-per-view (PPV) request before decrypting the encrypted program material using the first encryption key; and
recording billing information regarding the program material.

6. The method of claim 1, wherein the data stream is received in a receiver and the third key is unique to the receiver.

7. The method of claim 6, wherein the second key is unique to the receiver.

8. The method of claim 1, wherein the data stream further comprises metadata describing program material replay rights.

9. The method of claim 8, wherein the second encryption key is derived at least partially from the metadata.

10. The method of claim 9, wherein the second encryption key is derived at least partially from broadcast time of the program material.

11. The method of claim 10, further comprising step of augmenting the second encryption key with at least a portion of the metadata before encrypting the second encryption key according to the third encryption key.

12. The method of claim 11, further comprising steps of:
retrieving the stored further encrypted program material, encrypted first encryption key, and the fourth encryption key;
decrypting the fourth encryption key using the third encryption key to produce the second encryption key and the portion of the metadata;
decrypting the further encrypted program material with the second encryption key to produce the encrypted program material;
accepting a PPV request;
determining if the PPV request is permitted using the portion of the metadata; and
decrypting the encrypted first encryption key to produce the first encryption key and decrypting the encrypted program material using the first encryption key if the PPV request is permitted.

13. An apparatus for storing program material for subsequent replay, comprising:
a receiver, for receiving a data stream comprising the program material encrypted according to a first encryption key and an encrypted first encryption key;
a first encryption module, for further encrypting the encrypted program material according to a second encryption key and for encrypting the second encryption key according to a third encryption key to produce a fourth encryption key;
a first decryption module, for decrypting the fourth encryption key using the third encryption key to produce the second encryption key, and for decrypting the further encrypted program material to produce the encrypted program material;
a conditional access module, for decrypting the encrypted first encryption key to produce the first encryption key; and
a second decryption module, for decrypting the program material using the first encryption key.

14. The apparatus of claim 13, further comprising a media storage device, for storing the further encrypted program material the encrypted first encryption key, and the fourth encryption key.

15. The apparatus of claim 13, wherein:
the first encryption module further encrypts the encrypted first encryption key according to the second encryption key; and
the first decryption module further decrypts the further encrypted first encryption key according to the second encryption key.

16. The apparatus of claim 15, further comprising:
a user I/O device for accepting a viewing request; and
a purchase history module for accepting and storing billing information regarding the program material.

17. The apparatus of claim 16, wherein the conditional access module decrypts the encrypted first encryption key in response to the acceptance of a viewing request.

18. The apparatus of claim 13, wherein the second encryption key and the third encryption key are unique to the receiver.

19. The apparatus of claim 13, wherein the first decryption module and the first encryption module are implemented in a single chip device.

20. An apparatus for storing program material for subsequent replay, comprising:
means for receiving a data stream comprising the program material encrypted according to a first encryption key and an encrypted first encryption key;
means for further encrypting the encrypted program material according to a second encryption key;
means for encrypting the second encryption key according to a third encryption key to produce a fourth encryption key; and
means for providing the further encrypted program material, the encrypted first encryption key and the fourth encryption key for storage.

21. The apparatus of claim 20, further comprising:
means for retrieving the further encrypted program material from storage, encrypted first encryption key, and the fourth encryption key;
means for decrypting the fourth encryption key using the third encryption key to produce the second encryption key;
means for decrypting the further encrypted program material with the second encryption key to produce the encrypted program material;
means for decrypting the encrypted first encryption key to produce the first encryption key; and
means for decrypting the encrypted program material using the first encryption key.

22. The apparatus of claim 20, further comprising:
means for further encrypting the encrypted first encryption key according to the second encryption key; and
means for providing the further encrypted first encryption key for storage.

23. The apparatus of claim 22, further comprising:
means for retrieving the stored further encrypted program material, further encrypted first encryption key, and the fourth encryption key from storage;
means for decrypting the fourth encryption key using the third encryption key to produce the second encryption key;
means for decrypting the further encrypted program material with the second encryption key to produce the encrypted program material;
means for decrypting the further encrypted first decryption key according to the second encryption key to produce the first decryption key;
means for decrypting the encrypted first encryption key to produce the first encryption key; and
means for decrypting the encrypted program material using the first encryption key.

24. The apparatus of claim 23, further comprising:
means for accepting a pay-per-view (PPV) request before decrypting the encrypted program material using the first encryption key; and
means for recording billing information regarding the program material.

25. The apparatus of claim 20, wherein the data stream is received in a receiver and the third key is unique to the receiver.

26. The apparatus of claim 25, wherein the second key is unique to the receiver.

27. The apparatus of claim 20, wherein the data stream further comprises metadata describing program material replay rights.

28. The apparatus of claim 27, wherein the second encryption key is derived at least partially from the metadata.

29. The apparatus of claim 28, wherein the second encryption key is derived at least partially from broadcast time of the program material.

30. The apparatus of claim 29, further comprising means for augmenting the second encryption key with at least a portion of the metadata before encrypting the second encryption key according to the third encryption key.

31. The apparatus of claim 30, further comprising:
means for retrieving the stored further encrypted program material, encrypted first encryption key, and the fourth encryption key;
means for decrypting the fourth encryption key using the third encryption key to produce the second encryption key and the portion of the metadata;
means for decrypting the further encrypted program material with the second encryption key to produce the encrypted program material;
means for accepting a PPV request;
means for determining if the PPV request is permitted using the portion of the metadata; and
means for decrypting the encrypted first encryption key to produce the first encryption key and decrypting the encrypted program material using the first encryption key if the PPV request is permitted.

* * * * *